June 19, 1934.  E. R. WHARTON  1,963,513
VALVE STRUCTURE
Filed Nov. 10, 1931
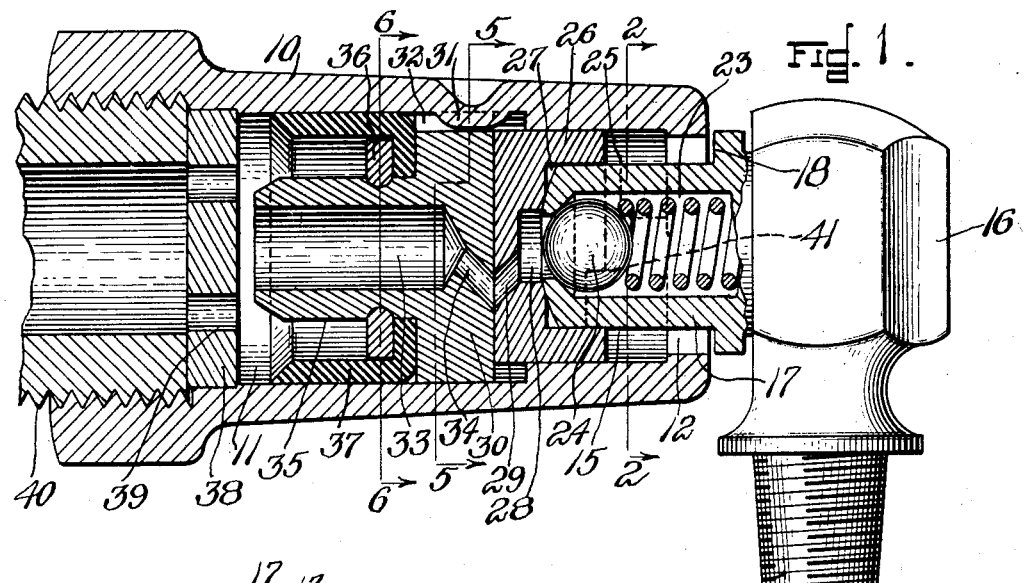
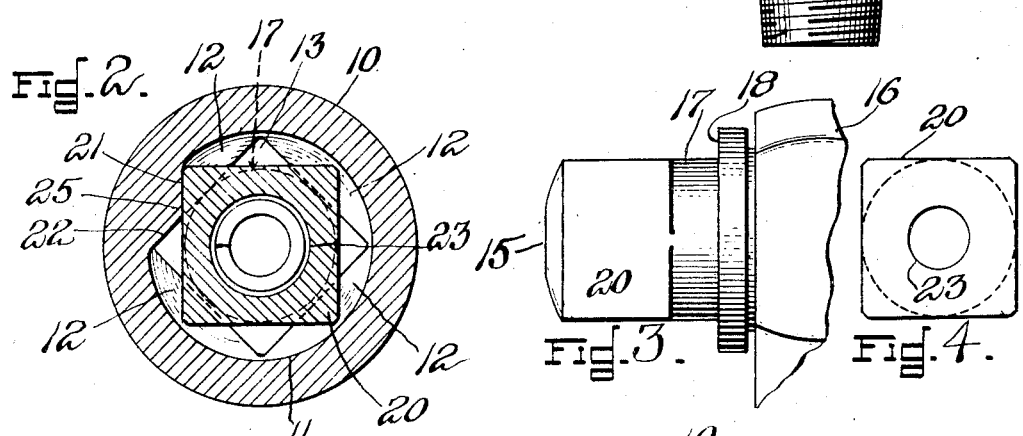
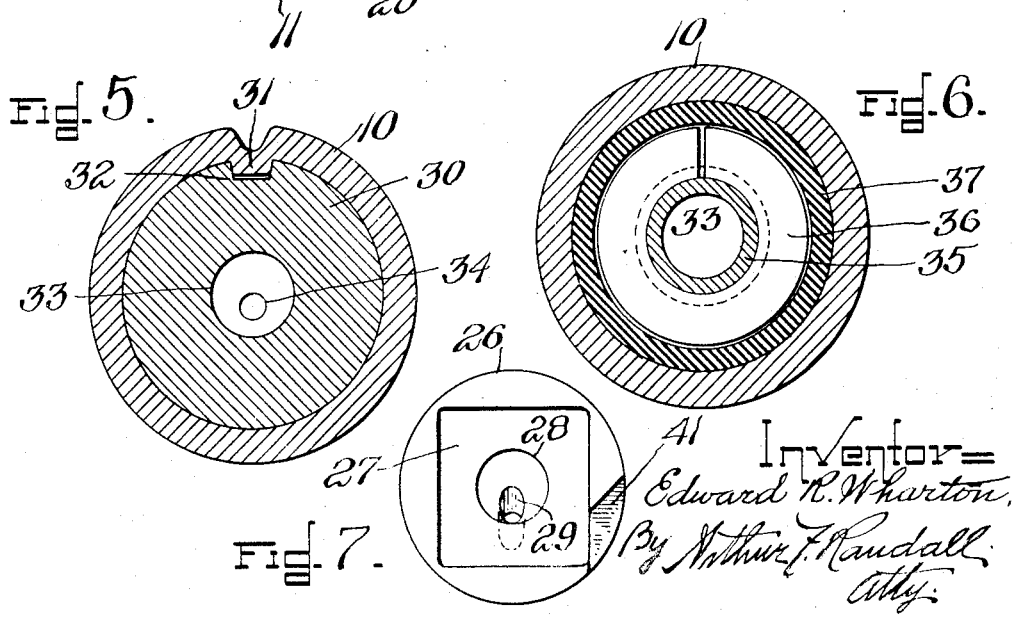
Inventor=
Edward R. Wharton,
By Arthur F. Randall
Atty.

Patented June 19, 1934

1,963,513

UNITED STATES PATENT OFFICE 1,963,513

VALVE STRUCTURE

Edward R. Wharton, Medford, Mass., assignor of one-fourth to Ewald G. Baum, Natick, Mass., one-fourth to Robert H. O. Schulz, Boston, Mass., and one-fourth to Nelson A. Hallett, Newton, Mass.

Application November 10, 1931, Serial No. 574,086

1 Claim. (Cl. 284—18)

My invention relates to valve structures but more especially to valve structures such as are incorporated in the delivery nozzles of grease guns and the like, and it has for its object to improve the construction of valve structures of this class.

It is also an object of this invention to provide an improved valve structure of the type shown and described in United States Letters Patent 1,837,804 granted to me December 22, 1931 and 1,844,532 granted to me February 9, 1932.

Grease guns and the like have heretofore been provided with a delivery nozzle comprising a tubular body whose outlet end portion was adapted to be slid telescopically on to a nipple forming part of a ported receiving fixture after which the nozzle was partially rotated on the nipple to interlock the two devices so that they would be held coupled together while operating the gun to deliver grease, oil or the like into the receiving fixture.

In my Patent 1,837,804, referred to above, the internal mechanism of the nozzle includes a valve member mounted within the body of the nozzle so that it can rotate and move axially relatively thereto, and also a ported valve seat member that is held in engagement with said valve member by the pressure of the fluid, grease or the like; said valve seat member being mounted within said body so that it can move axially but not rotatively with relation thereto.

My present invention is a nozzle characterized by the same principle of construction as in the application referred to but of simplified and otherwise improved construction. My present invention also provides a receiving fixture of novel and advantageous construction.

In the accompanying drawing:

Figure 1 is a central longitudinal sectional view of a delivery nozzle constructed in accordance with this invention, said nozzle being shown as applied to a complementary receiving fixture of novel construction, said receiving fixture being shown partly in section.

Figure 2 is a section on line 2—2 of Figure 1.

Figure 3 is a side elevation of a portion of the receiving fixture shown in Figure 1.

Figure 4 is an end view of the nipple of the receiving fixture shown in Figures 1 and 2.

Figure 5 is a section on line 5—5 of Figure 1.

Figure 6 is a section on line 6—6 of Figure 1.

Figure 7 is an elevation of the valve member hereinafter described, as viewed from its outer end.

The embodiment of my invention herein illustrated comprises a body or housing member 10 that is formed interiorly with a bore or chamber 11 extending from end to end thereof and which is approximately cylindrical throughout.

As viewed in Figure 1, the left hand end of chamber 11 is the inlet end thereof and the opposite end is the outlet end of the same.

The outlet end of body 10 is formed interiorly with flange segments 12, Figs. 1 and 2, which provide said end with a square opening or hole 13 communicating with chamber 11 and serving as a passageway for the end portion of the nipple 15 of a receiving fixture 16, Figs. 1 and 3.

Excepting the nipple 15, the receiving fixture 16 is of usual construction and is ordinarily permanently attached to a bearing or the like.

The nipple 15 is formed with a neck 17 at the inner end of which is provided an annular shoulder 18 and at the outer end of which is provided a head 20. The neck 17 is exteriorly cylindrical in cross section while the head 20 is exteriorly square in cross section and of a size to pass freely through the square opening or hole 13.

The diameter of the cylindrical neck 17 is approximately the same as the width of the square head 20 and each corner portion of said head provides a lug that is adapted to be positioned behind one of the segmental flanges 12 when the head 20 is passed through the hole 13 into chamber 11 and then rotated to the extent of forty-five degrees.

When the body 10 and nipple 15 are engaged in this manner the body is securely interlocked with the nipple so that, because of the corner lugs of head 20 and the annular shoulder 18, it cannot move axially on the nipple.

Therefore, to connect the body 10 with the nipple the outlet end of said body is slid telescopically on to the nipple and then rotated as described to the extent of forty-five degrees at the end of which rotary movement one of the corner lugs of head 20 is brought into engagement with a stop shoulder 21, Fig. 2, provided on body 10 within chamber 11. Thus the stop shoulder 21 serves to position the corner or lug portions of the head 20 behind flange segments 12.

When it is desired to remove the body 10 from the nipple, said body is turned in the opposite direction until another corner or lug portion of head 20 is brought into engagement with a stop shoulder 22 provided on body 10 within the chamber 11. When the rotary movement of body 10 is thus arrested the square head 20 is in register with the square hole or opening 13 and the body 10 can be removed from the nipple.

The shoulders 21 and 22 are the opposite sides of a lug 25 provided upon the interior of body 10.

The fixture 16 is made with a port or conduit 23 whose inlet end is at the center of head 20 and is controlled by an outwardly closing spring-pressed ball check-valve 24.

Within the chamber 11 and behind the lug 25 is provided a rotatable and axially movable valve-member 26 which is a cylindrical block of metal provided upon its outer side with a square socket 27 that is adapted to receive within it the head 20 of the nipple when body 10 is applied to the latter as described above. When the body 10 is fitted telescopically on to the nipple as described, the head 20 occupies the socket 27 so that when said body is turned on the nipple to lock it to the latter, the valve 26 is held against rotation with the body by the nipple.

At the bottom of the socket 27 is a recess 28 from the bottom of which a port 29 leads to the inner face of valve 26, said inner face being a plane surface at right angles to the axis of the nozzle and valve, and the inlet end of said port 29 being disposed eccentrically, or off-set, with respect to said axis.

The inner end of the valve member 26 seats against, or abuts, the outer end of a valve-seat member 30, said outer end being likewise made flat and at right angles with respect to the axis of the nozzle so as to serve as a seat for the valve 26.

The valve-seat member 30 is approximately cylindrical exteriorly and is slidably mounted within the body 10, but is held against rotating with respect to said body by means of a spline 31 on body 10 occupying a longitudinal groove 32 provided upon the exterior of the valve-seat member 30.

It will therefore be clear that the valve-seat member is free to slide longitudinally with respect to the housing member 10 but is splined to the same so that it is rotated by and with said housing member when the latter is rotated while applying it to, or removing it from, the nipple.

The valve seat member 30 is made with a longitudinal conduit 33 having an outlet end portion 34 disposed eccentrically to co-operate with the port 29 of valve member 26.

The larger inlet end portion of conduit 33 extends longitudinally through a nipple 35 projecting from the inner end of the valve-seat member 30, and this nipple is made upon its exterior with an annular groove into which is sprung a split ring 36, Figs. 1 and 6, by which a cup-shaped packing ring 37 of leather is fastened in position upon the nipple 35 of the valve-seat member.

Within the inlet end of body 10, opposite nipple 35, is permanently fixed a partition wall 38 through which are formed a plurality of ports 39. Behind the partition wall 38 the body 10 is interiorly threaded so that it can be screwed on to the outlet nipple 40 of a grease gun or the like.

When body 10 is locked in position upon the nipple 15 of the receiving fixture the outlet end of the port 34 is in register with the inlet end of port 29 and therefore, operation of the grease gun or the like will force the grease or other fluid material through ports 39, 33, 34 and 29 into the recess 28 from which it is forced past valve 24 into conduit 23.

So long as the body 10 is in position upon, and interlocked with, nipple 15 the two ports 29 and 34 will be in register, but when the body 10 is turned on the nipple in a direction to unlock the same preparatory to removal, the rotary movement imparted to the valve-seat member 30 by body 10 will shift the outlet end of port 34 away from port 29 thereby closing the valve mechanism.

It follows of course, that when body 10 is slid into position on to nipple 15 and rotated to interlock it with the same, the rotary movement imparted to valve-seat member 30 brings the eccentric port 34 into register with the inlet end of the eccentric port 29.

As the body 10 is removed from nipple 15 the pressure of the grease or other fluid within the gun is imposed upon the inner end of valve seat member 30 and the latter is moved thereby toward the right, Fig. 1, carrying the valve member 26 with it until the outer end of the latter abuts the lug 25.

The outer end of the valve member 26 is formed with a socket 41, Figs. 1 and 7, to receive and fit the lug 25 as the housing member 10 is slid endwise off from the nipple, the pressure within the gun acting through valve seat-member 30 to hold valve member 26 against the end of the nipple until the lug 25 enters socket 41 and engages the bottom thereof. Thus while the body member 10 is disengaged from the nipple the valve member 26 is locked against rotative displacement within the housing member by the side walls of the socket 41. When the lug 25 occupies the socket 41 the square socket 27 of the valve member 26 is in register with the square passageway 13 of body member 10 as will be clear.

The pressure of the contents of the gun, when the latter is not in use, serves to hold the valve and valve-seat members at the limits of their movements toward the right, Fig. 1.

Therefore, as the body 10 is slid into position upon the nipple 15 the outer end of said nipple is caused to bear against the valve member 26 so that the body 10 thereafter completes its movement toward the right, Fig. 1, while the valve and valve-seat members are held stationary by the nipple. This insures a closed joint between the end of the nipple and its seat on valve member 26.

The above described valve structure is characterized by simplicity of construction and low cost of manufacture. It is also efficient and reliable in its operation.

A particular point of advantage to the valve structure above described is that the square head 20 of the nipple cooperating with a body member having the four flange segments 12, engages said flanges at four points distributed at regular intervals around the axis of the nipple thereby providing a much firmer hold or connection than is possible with a nipple head having but two diametrically disposed lugs as heretofore. Furthermore the head 20 of the nipple may snugly fit the socket 27 thereby providing an extensive closed joint between the nipple head and valve member which tends to prevent leakage while the gun is being operated.

What I claim is:

A valve structure for controlling the delivery of a fluid under pressure comprising a tubular housing member whose outlet end portion is interiorly flanged so as to provide a non-circular passageway for the head of the nipple of a receiving fixture and also a plurality of abutments for holding said head within said member; stop shoulders within said housing member adapted to engage the nipple of the receiving fixture to limit the rotary movement of said housing member thereon in both directions; a ported valve member within and rotatably associated with said housing member, said valve member having its outer end made with a socket to receive the head of the nipple of the receiving fixture and being yieldingly urged toward said passageway so that it is displaced axially by the nipple when the housing member is shoved on to the latter and is automatically moved in the opposite direction when said housing member is withdrawn from said nipple, and means for automatically locking said valve member against rotative displacement relatively to said housing member when the latter is withdrawn from said nipple.

EDWARD R. WHARTON.